(12) United States Patent
Toba

(10) Patent No.: US 6,374,125 B1
(45) Date of Patent: Apr. 16, 2002

(54) MOBILE TELEPHONE AND METHOD OF RETRIEVING RECEPTION/TRANSMISSION HISTORY IN MOBILE TELEPHONE

(75) Inventor: Hiroyuki Toba, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/270,775

(22) Filed: Mar. 17, 1999

(30) Foreign Application Priority Data

Mar. 24, 1998 (JP) .......................................... 10-075412

(51) Int. Cl.[7] .................................................. H04M 1/00
(52) U.S. Cl. ........................ 455/563; 455/569; 455/407; 455/403; 704/251
(58) Field of Search ................................ 455/563, 569, 455/407, 403, 564; 704/251, 275, 270

(56) References Cited

U.S. PATENT DOCUMENTS

| | | | |
|---|---|---|---|
| 4,739,509 A | * 4/1988 | Bourg | 379/93 |
| 5,054,053 A | * 10/1991 | Sakanishi et al. | 379/63 |
| 5,241,586 A | * 8/1993 | Wilson et al. | 379/88 |
| 5,276,729 A | * 1/1994 | Higuchi et al. | 379/58 |
| 5,339,352 A | * 8/1994 | Armstrong et al. | 379/58 |
| 5,715,311 A | * 2/1998 | Sudo et al. | 379/428 |
| 5,799,256 A | * 8/1998 | Pombo et al. | 455/574 |
| 5,940,488 A | * 8/1999 | DeGrazia et al. | 379/201 |

* cited by examiner

*Primary Examiner*—Daniel Hunter
*Assistant Examiner*—Lana Le
(74) *Attorney, Agent, or Firm*—Young & Thompson

(57) ABSTRACT

There is provided a mobile telephone including (a) a voice recognizer for recognizing a voice made entry thereinto, (b) a memory storing reception/transmission history therein, and (c) a controller for evoking the reception/transmission history from the memory on entry of a voice into the voice recognizer. The mobile telephone makes it possible for an operator to retrieve reception/transmission history without any key operation.

4 Claims, 5 Drawing Sheets

FIG.1A
PRIOR ART
FIG.1B
PRIOR ART
```
03  13:43
ANDREW J. PATCH
010 12 12345
```
```
01  19:45
NO PHONE NUMBER
```
```
25  10:15
ROBERT
080 12 34567
```
```
MOBILE TELEPHONE 1
030 76 54321
```
```
049 50 01234
```
```
BILL CLINTON
050 12 12345
```

MOBILE TELEPHONE AND METHOD OF RETRIEVING RECEPTION/TRANSMISSION HISTORY IN MOBILE TELEPHONE

BACKGROUND OF THE INVENTION

1. Field of the Invention

The present invention relates to a mobile telephone, and more particularly, to a mobile telephone having a voice recognition function to perform a part of mobile telephone functions by making entry of a voice, or speaking, to the mobile telephone.

2. Description of the Related art

Heretofore, there have been proposed various types of mobile telephones, of which a typical one is explained hereinbelow with reference to FIGS. 1A and 1B.

FIGS. 1A and 1B show examples of display on a LCD screen in a conventional mobile telephone. FIG. 1A shows an example of evoked reception history contents displayed on a LCD screen, and FIG. 1B shows an example of evoked transmission history contents displayed on a LCD screen.

Some of conventional mobile telephone are provided with a function to keep a reception history including data such as a call arrival time, caller's name, caller's phone number, and so on, comprised of calls arriving at the mobile telephone, and a transmission history including data such as a subscriber's name or classifying information, phone number, and so on, of a destination telephone to which a user of the mobile telephone has made a call.

The reception and transmission history function makes it possible to keep a plurality of reception and transmission history data. The reception or transmission history is evoked and displayed on a LCD display through a key operation made by a user of a mobile telephone. By a further key operation, the data of the reception and transmission history can be displayed one after another on a LCD screen, as illustrated in FIGS. 1A and 1B.

As mentioned above, a telephone user has to make such key operations to evoke and display reception or transmission history on a LCD display. Namely, it is not so easy to evoke reception and transmission history in the conventional mobile telephone without such key operations.

In addition, a further complicated and troublesome key operation is required for retrieving desired reception or transmission history and displaying on a screen, based on a date and time, for example, of a call having been received or transmitted.

The inventor filed a patent application as the Japanese patent application No. 9-274609 concerning a mobile telephone with a voice recognition function. The application discloses a mobile telephone adapted to be able to perform a variety of functions by making entry of a voice, or speaking, to a user's telephone. It should be noted that the applicant cites the above-identified application merely for better understanding of the present invention, but does not admit the application as prior art. The above-identified application will be published for public inspection on about March or April 1999.

Japanese Unexamined Patent Publication No. 4-306944 has suggested a mobile telephone including a voice recognizer, a head set, and a switch electrically connected to the head set. Only while the switch is being actuated, a voice is made entry to the voice recognizer from the head set, thereby transmission can be made by a voice of a user.

Japanese Unexamined Patent Publication No. 5-316193 has suggested a mobile communication terminal comprising means for constructing subscribers' number data base and inputting conditions for retrieving data through a voice, means for scrolling retrieved data, and means for transmitting a call based on the thus scrolled data.

Japanese Unexamined Patent Publication No. 7-221819 has suggested a telephone including a timer, a display, and an automatic transmitter for transmitting a call to a time service station to thereby have the present time. The thus obtained present time is phonetically recognized, and the thus phonetically recognized present time is set in the timer and displayed on the display.

Japanese Unexamined Patent Publication No. 8-182053 has suggested a mobile communication terminal including a screen on which data such as reception/transmission date and time, and a destination telephone number, is displayed when a redial button is actuated.

Japanese Unexamined Patent Publication No. 8-186654 has suggested a mobile communication terminal including means for switching a mode between a terminal mode and a telephone mode, means for making radio-communication with a host computer, means for receiving a voice input and recognizing the received voice, and means for mixing voices and outputting them.

Japanese Unexamined Patent Publication No. 8-274864 has suggested a telephone which extracts telephone directory data having been transmitted from an opponent telephone, and stores the thus extracted data in a first memory, ensuring that a user can redial a call to the opponent telephone.

Japanese Unexamined Patent Publication No. 9-326854 has suggested a telephone including a program which provides a user both a program brunch having been in advance selected by the user and options available by the user in the program brunch, when the user inputs a help signal thereto. The above-identified Publication is based on the Dutch application numbered 96101369.5 filed on Jan. 30, 1997.

Japanese Unexamined Patent Publication No. 2-250532 has suggested a radio telephone unit including means for inputting a voice therethrough, means for converting the thus input voice into audio data, means for comparing the thus converted audio data with audio data stored in advance in a memory, and means for removing prohibition of reception and transmission of a call.

Japanese Unexamined Patent Publication No. 3-3539 has suggested an automobile telephone in which command voices are compared with voice data stored in advance in a memory. If they are coincident with each other, the stored voice data are listed. On the other hand, if they are not coincident with each other, possible ones are retrieved among the stored voice data, and listed. One or more can be selected among the thus listed voice data.

Japanese Unexamined Patent Publication No. 6-78041 has suggested a codeless telephone having a voice recognizer which sets a threshold value for detecting a voice period, in accordance with a number indicative of a telephone as a transmitter, and properly detects a voice period, based on input voice signals. Thus, a standard pattern of stored words and a characteristic pattern of input words can be detected.

Japanese Unexamined Patent Publication No. 8-8812 has suggested a digital mobile telephone including a digital signal processor which recognizes a voice transmitted from a microphone, and displays the recognition results on a screen.

The above-mentioned Publications make it possible for a user to retrieve data by inputting voice data thereinto. However, they have to have a complicated structure to do so.

SUMMARY OF THE INVENTION

In view of the above-mentioned drawbacks of the prior art, it is an object of the present invention to provide an improved mobile telephone adapted to have a simpler structure, but allow a user thereof to refer to reception and/or transmission history without any key operation.

It is also an object of the present invention to provide a method of retrieving reception and/or transmission history in a mobile telephone in a simpler manner.

In one aspect of the present invention, there is provided a mobile telephone including (a) a voice recognizer for recognizing a voice made entry thereinto, (b) a memory storing reception/transmission history therein, and (c) a controller for evoking the reception/transmission history from the memory on entry of a voice into the voice recognizer.

It is preferable that if a plurality of reception/transmission history are stored in the memory, the controller evokes the reception/transmission history one after another on entry of a voice into the voice recognizer.

There is further provided a mobile telephone including (a) a voice recognizer for recognizing a voice made entry thereinto, (b) a real-time identifier for identifying the current time, (c) a memory storing reception/transmission history therein in association with the time at which reception/transmission was made, and (d) a controller, on entry of a voice identifying a certain time, into the voice recognizer, for evoking the reception/transmission history from the memory, based on the identified time.

In another aspect of the present invention, there is provided a method of retrieving reception/transmission history in a mobile telephone, including the steps of (a) storing reception/transmission history, (b) recognizing a voice of an operator, and (c) evoking the reception/transmission history on entry of a voice into the mobile telephone.

It is preferable that if there are stored a plurality of reception/transmission history, the reception/transmission history is evoked one after another in the step (c).

There is further provided a method of retrieving reception/transmission history in a mobile telephone, including the steps of (a) identifying the time at which reception/transmission was made, and storing reception/transmission history in association with the thus identified current time, (b) recognizing a voice of an operator, and (c) on entry of a voice identifying a certain time, into the mobile telephone, evoking the reception/transmission history, based on the identified time.

In accordance with the present invention, there is provided a mobile telephone having a voice recognition function, adapted to be able to display or retrieve reception and/or transmission history data merely by entry of a voice thereinto without effecting any key operation.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 1A illustrates an example of evoked reception history data displayed on a LCD screen in a conventional mobile telephone.

FIG. 1B illustrates an example of evoked transmission history data displayed on a LCD screen in a conventional mobile telephone.

DESCRIPTION OF THE PREFERRED EMBODIMENTS

Preferred embodiments in accordance with the present invention will be explained hereinbelow with reference to drawings.

First Embodiment

Figure 2:
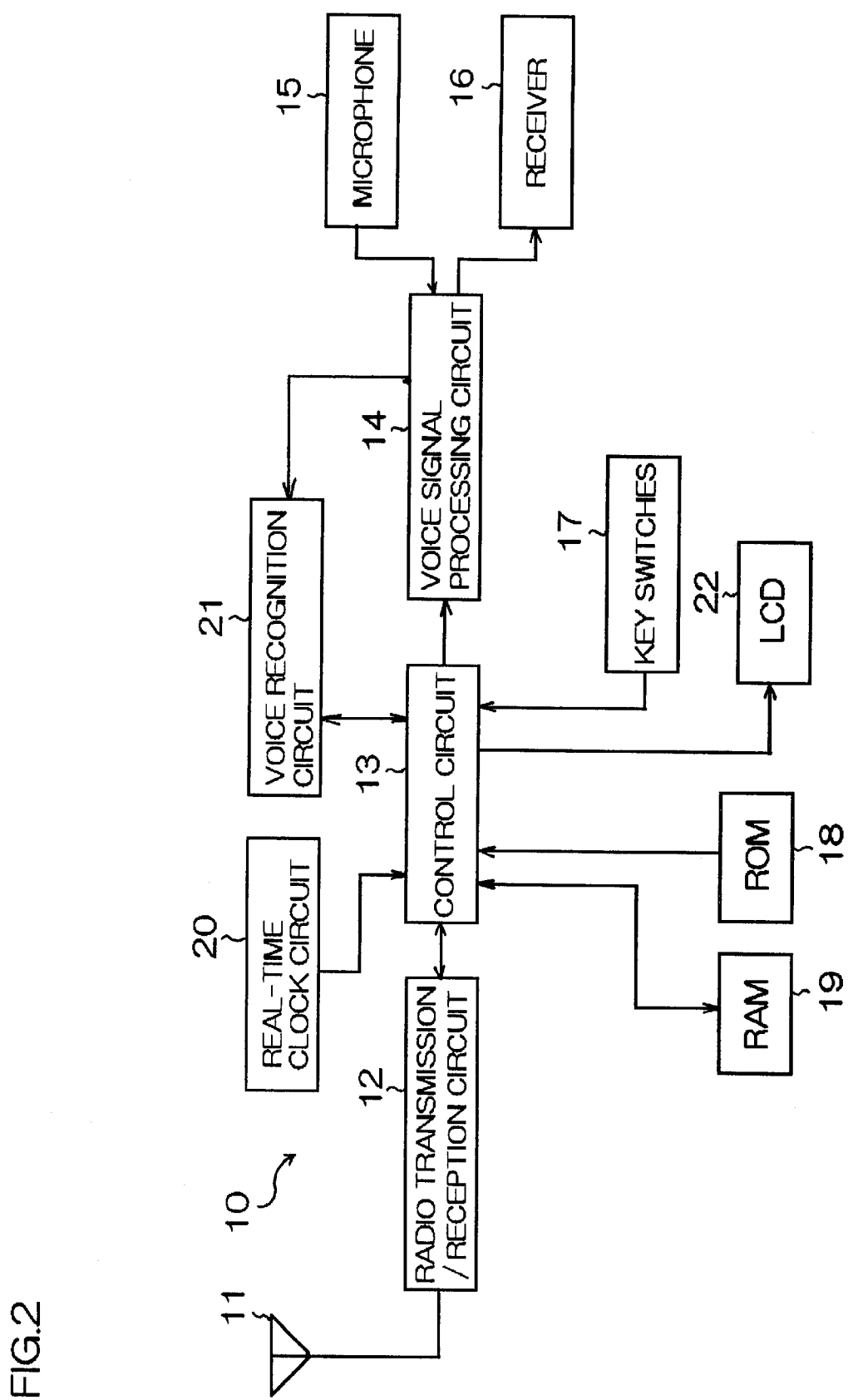
FIG. 2 is a block diagram of the mobile telephone in accordance with the first embodiment of the present invention.

Referring now to FIG. 2, there is schematically illustrated in the form of a block diagram of a mobile telephone in accordance with the first embodiment of the present invention.

As illustrated in FIG. 2, the mobile telephone 10 in accordance with the first embodiment is comprised of an antenna 11, a radio transmission/reception circuit 12 connected to the antenna 11, a control circuit 13, a voice signal processing circuit 14, a microphone 15, a receiver 16, key switches 17, ROM 18, RAM 19, a real-time clock circuit 20, a voice recognition circuit 21, and LCD 22. The radio transmission/reception circuit 12, the voice signal processing circuit 14, the key switches 17, ROM 18, RAM 19, the real-time clock circuit 20, the voice recognition circuit 21, and LCD 22 are all electrically connected to the control circuit 13. The microphone 15, the receiver 16, and the voice recognition circuit 21 are all electrically connected to the voice signal processing circuit 14.

The antenna 11 receives a radio signal from a base station (not illustrated), and feeds the thus received radio signal to the radio transmission/reception circuit 12. The antenna 11 receives also a signal transmitted from the radio transmission/reception circuit 12, and transmits it to the base station. The radio transmission/reception circuit 12 is comprised mainly of a reception circuit and a transmission circuit.

When a call arrives at the mobile telephone 10, the radio transmission/reception circuit 12 receives a call signal from the antenna 11, and transmits it to the control circuit 13. The control circuit 13 stores the thus received call signal into RAM 19 as a reception history data. On the other hand, when a user makes a call by operating the key switches 17, the control circuit 13 provides a transmission signal to the radio transmission/reception circuit 12, which transmits the thus received transmission signal to the base station via the antenna 11. The control circuit 13 stores the transmission signal into RAM 19 as a transmission history data.

The control circuit 13 is connected to the real-time clock circuit 20, which informs the control circuit 13 of time-wise information including a year, a month, a day, a time, and the like. When storing the reception or transmission history into RAM 19, the control circuit 13 adds the time-wise information supplied from the real-time clock circuit 20, to the reception or transmission history. That is, a caller's phone number or destination phone number is stored into RAM 19, along with the time-wise information including a year, a month, a day and a time at which the information is stored, as reception/transmission history data.

When the key switches 17 are operated by a user to thereby put the mobile telephone 10 in a condition in which voice entry can be carried out, the control circuit 13 supplies voice data to be used for voice recognition, stored in ROM 18, to the voice recognition circuit 21. Then, when a user speaks to the microphone 15 to make entry of voice data, the voice signal processing circuit 14 converts the entered voice data to a digital signal, and supplies the thus converted digital signal to the voice recognition circuit 21. The voice recognition circuit 21 compares the voice data supplied from ROM 18 and the data supplied from the voice signal processing circuit 14 with each other to thereby judge what is meant by the voice data entered through the microphone 15.

When the voice recognition circuit 21 completes the judgment, the voice recognition circuit 21 gives an instruction to the control circuit 13 to both receive response voice data stored in ROM 18 for noticing a result of the judgment and display the judgment result on LCD 22. The control circuit 13 reads out the response voice data transmitted from ROM 18, and supplies the thus read out response voice data to the voice signal processing circuit 14, while displaying the judgment result on LCD 22. The voice signal processing circuit 14 converts the supplied response voice data into a voice signal, and transmits the thus converted signal through the receiver 16.

Hereinbelow is explained an operation of the mobile telephone 10 in accordance with the first embodiment.

Figure 3:
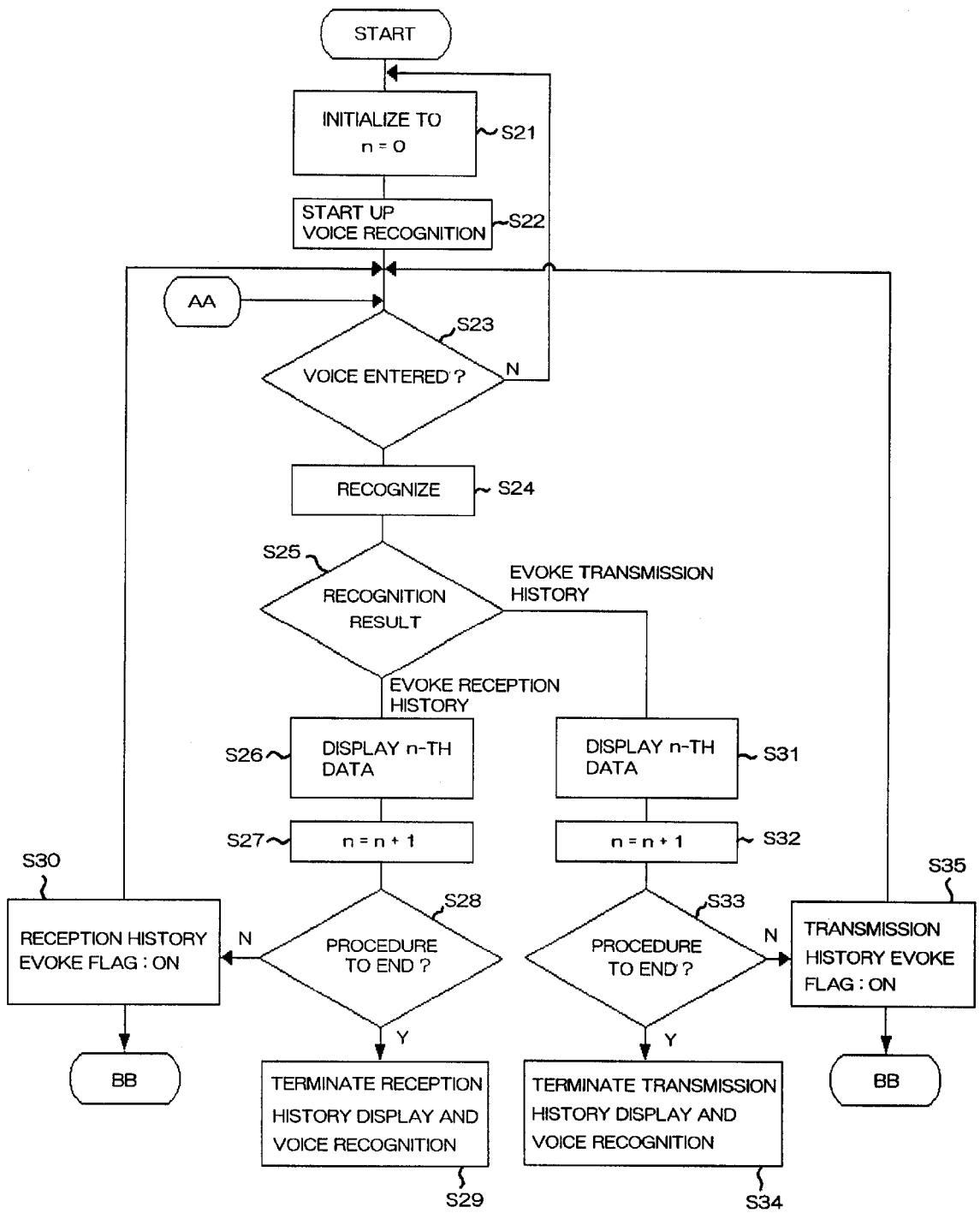
FIG. 3 is a flow chart of operations to be carried out in the mobile telephone in accordance with the first embodiment of the present invention.

FIG. 3 is a flow chart of an operation of the mobile telephone 10 in accordance with the first embodiment of the present invention.

First, an initial value n is set to be equal to zero (n=0) in step S21. This initial value constitutes a memory location number of reception or transmission history data of which the date and time are nearest to a current date and time. A memory such as RAM 19 can store a maximum number n of reception and transmission history data. Namely, the reception or transmission history data is numbered as n=0, 1, 2, . . . , n−2, n−1 and n in a direction from the oldest to newest ones.

The key switches are operated to thereby start up the voice recognition procedure for accepting a voice input, in step S22. When no voice input is entered for a certain period of time starting from step S22, the control circuit 13 terminates the voice recognition procedure, and waits again for restarting the voice recognition procedure.

If a voice is entered and recognized in step S24, and judged in step S25 to be a voice requiring to evoke reception history, the n-th data is displayed, in step S26. Herein, the date and time of the n-th data are nearest to the current date and time. At this time, if a voice-response mode is set, the result of the voice recognition is output through the receiver 16 as well. Then, the initial value n is changed to n=n+1 in step S27, and the control circuit 13 waits for a next operation to be carried out by a user of the mobile telephone.

If the voice recognition is ended in step S28, the reception history display and the voice recognition procedure are terminated in step S29 (YES in step S28). If the reception history display and the voice recognition procedure are continued in step S28 (NO in step S28), the reception history flag is turned ON in order to recognize that the reception history is currently evoked, in step S30.

At this time, if a voice for prompting to display a next data, such as "Next display", for example, is entered, the voice recognition is carried out again, and the n-th data (of which the date and time are nearest to the current ones) is displayed. Herein, the date and time of the n-th data is older than the previous data, but is newest among the rest. At this time, if the voice-response mode is set, the result of the voice recognition is output through the receiver 16. The continuation of the voice recognition procedure enables to display the reception history data beginning with the oldest one stored in RAM 19 in the mobile telephone.

On the other hand, if the voice input is judged to be a voice requiring to evoke transmission history in step S25, the n-th data is displayed in step S31. Herein, the date and time of the n-th data are nearest to the current date and time. At this time, if the voice-response mode is set, the result of the voice recognition procedure is output through the receiver 16 as well. Then, the initial value n is changed to n=n+1 in step S32, and the control circuit 13 waits for a next operation.

When the voice recognition is forced to end in step S33, the transmission history display and the voice recognition procedure are ended in step S34. If the transmission history display and the voice recognition procedure are continued to be carried out, the transmission history flag is turned ON in step S35 in order to recognize that the transmission history is currently evoked.

At this time, if a voice for prompting to display a next data, such as "Next display", for example, is entered, the voice recognition procedure is carried out again, and the n-th data is displayed. Herein, the date and time of the n-th data is older than the previous data, but is newest among the rest. If a voice-response mode is set, the voice recognition result is output through the receiver 16. This continuation of the voice recognition procedure enables to display the transmission history data beginning with the oldest one stored in RAM 19 in the mobile telephone.

Second Embodiment

The mobile telephone in accordance with the second embodiment is described hereinbelow.

In the above-mentioned first embodiment, transmission or reception history is first evoked, and then a voice is entered, resulting in that the transmission or reception history data can be evoked one after another. Each of the transmission and reception history data is stored in RAM 19, including time-wise information added thereto by means of the real-time clock circuit 20. Hence, by making entry of a voice together with time-wise information, reception or transmission history data associated with the time-wise information can be evoked.

Figure 4:
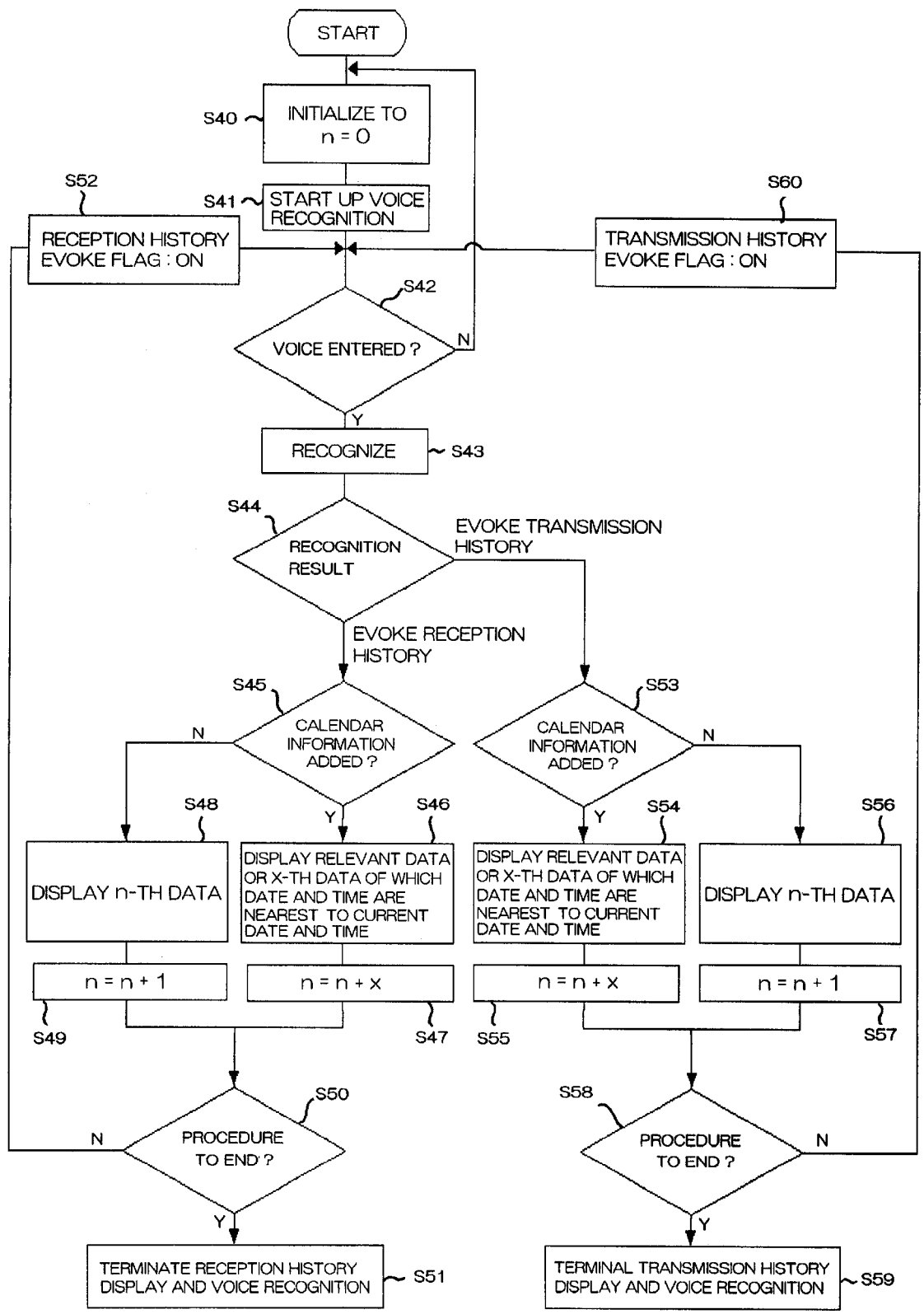
FIG. 4 is a flow chart of operations to be carried out in the mobile telephone in accordance with the second embodiment of the present invention.

The second embodiment is explained hereinbelow with reference to FIG. 4, which is a flow chart of an operation to be carried out in the second embodiment.

First, an initial value n is set to be equal to zero (n=0) in step S40. This initial value constitutes a memory location number of reception or transmission history data of which the date and time are nearest to a current date and time. A memory such as RAM 19 can store a maximum number n of reception and transmission history data. Namely, the reception or transmission history data is numbered as n=0, 1, 2, . . . , n−2, n−1 and n in a direction from the oldest to newest ones.

The key switches are operated to thereby start up the voice recognition procedure for accepting a voice input, in step S41. When no voice input is entered for a certain period of time starting from step S41, the control circuit 13 terminates the voice recognition procedure, and waits again for restarting the voice recognition procedure.

If a voice is entered and recognized in step S42, and judged in step S43 to be a voice requiring to evoke reception history, the control circuit 13 proceeds to an operation for displaying the reception history data.

If it is judged in step S45 that a voice input includes calendar information such as date and time like "Reception history dated January 3", for example, and is actually judged to include such calendar information in the result of voice recognition, reception history data stored at a corresponding x-th memory is retrieved and evoked for display on LCD 22, in step S46.

At this time, if the voice-response mode is set, the recognition result is output through the receiver 16 as well. Then, the initial value n is changed to n=n+x in step S47, and the control circuit 13 waits for a next operation to be carried out by a user of the mobile telephone. It should be noted that if the result of the retrieval shows that there exists no data at the indicated date, namely, the January 3, an x-th reception history data having the date nearest to the retrieval date is displayed in step S46.

If it is judged in step S45 that no calendar information such as date and time is added to the voice input, an n-th data is displayed in step S48. Herein, the date and time of the n-th data is nearest to the current date and time.

At this time, if the voice-response mode is set, the result of the voice recognition is output through the receiver 16 as well. Then, the initial value n is changed into n=n+1 in step S49, and the control circuit 13 waits for a next operation.

If the voice recognition is forced to end in step S50, the reception history display and the voice recognition procedure are terminated in step S51. If the recognition is continued in step S50, the reception history flag is turned ON in step S52 in order to recognize that the reception history is currently evoked.

At this time, if a prompting voice to display a next data, such as "Next display", for example, is entered, the voice recognition is carried out, and the n-th data is displayed. Herein, the n-th data is just older than the previous data by only one.

If the voice-response mode is set, the recognition result is output through the receiver 16. The continuation of the recognition enables to display the reception history data beginning with the oldest one stored in RAM 19 in the mobile telephone.

If time-wise information like "December 25", for example, is made entry again during entry of a voice, reception history data associated with the indicated date can be retrieved to display a corresponding x-th data.

If the entered voice is judged in step S44 to be a voice requiring to evoke transmission history, the control circuit 13 proceeds to an operation for displaying the transmission history.

If it is judged in step S53 that a voice input includes calendar information such as date and time like "Transmission history dated January 3", for example, and is actually judged to include such calendar information in the result of voice recognition, transmission history data stored at a corresponding x-th memory is retrieved and evoked for display on LCD 22, in step S54.

At this time, if the voice-response mode is set, the recognition result is output through the receiver 16 as well. Then, the initial value n is changed to n=n+x in step S55, and the control circuit 13 waits for a next operation to be carried out by a user of the mobile telephone. It should be noted that if the result of the retrieval shows that there exists no data at the indicated date, namely, the January 3, an x-th transmission history data having the date nearest to the retrieval date is displayed in step S54.

If it is judged in step S53 that no calendar information such as date and time is added to the voice input, an n-th data is displayed in step S56. Herein, the date and time of the n-th data is nearest to the current date and time.

At this time, if the voice-response mode is set, the result of the voice recognition is output through the receiver 16 as well. Then, the initial value n is changed into n=n+1 in step S57, and the control circuit 13 waits for a next operation.

If the voice recognition is forced to end in step S58, the transmission history display and the voice recognition procedure are terminated in step S59. If the recognition is continued in step S58, the transmission history flag is turned ON in step S60 in order to recognize that the transmission history is currently evoked.

At this time, if a prompting voice to display a next data, such as "Next display", for example, is entered, the voice recognition is carried out, and the n-th data is displayed. Herein, the n-th data is just older than the previous data by only one.

If the voice-response mode is set, the recognition result is output through the receiver 16. The continuation of the recognition enables to display the transmission history data beginning with the oldest one stored in RAM 19 in the mobile telephone.

If time-wise information like "December 25", for example, is made entry again during entry of a voice, transmission history data associated with the indicated date can be retrieved to display a corresponding x-th data.

Third Embodiment

Hereinbelow is explained the mobile telephone in accordance with the third embodiment of the present invention.

In the first and second embodiments having been described with reference to FIGS. 3 and 4, the voice recognition procedure is always in operation while reception or transmission history data is being evoked. However, the prevent invention can be applied to a mobile telephone having an independent voice recognition function, that is, a mobile telephone in which the voice recognition procedure is automatically terminated upon delivery of a recognition result.

Figure 5:
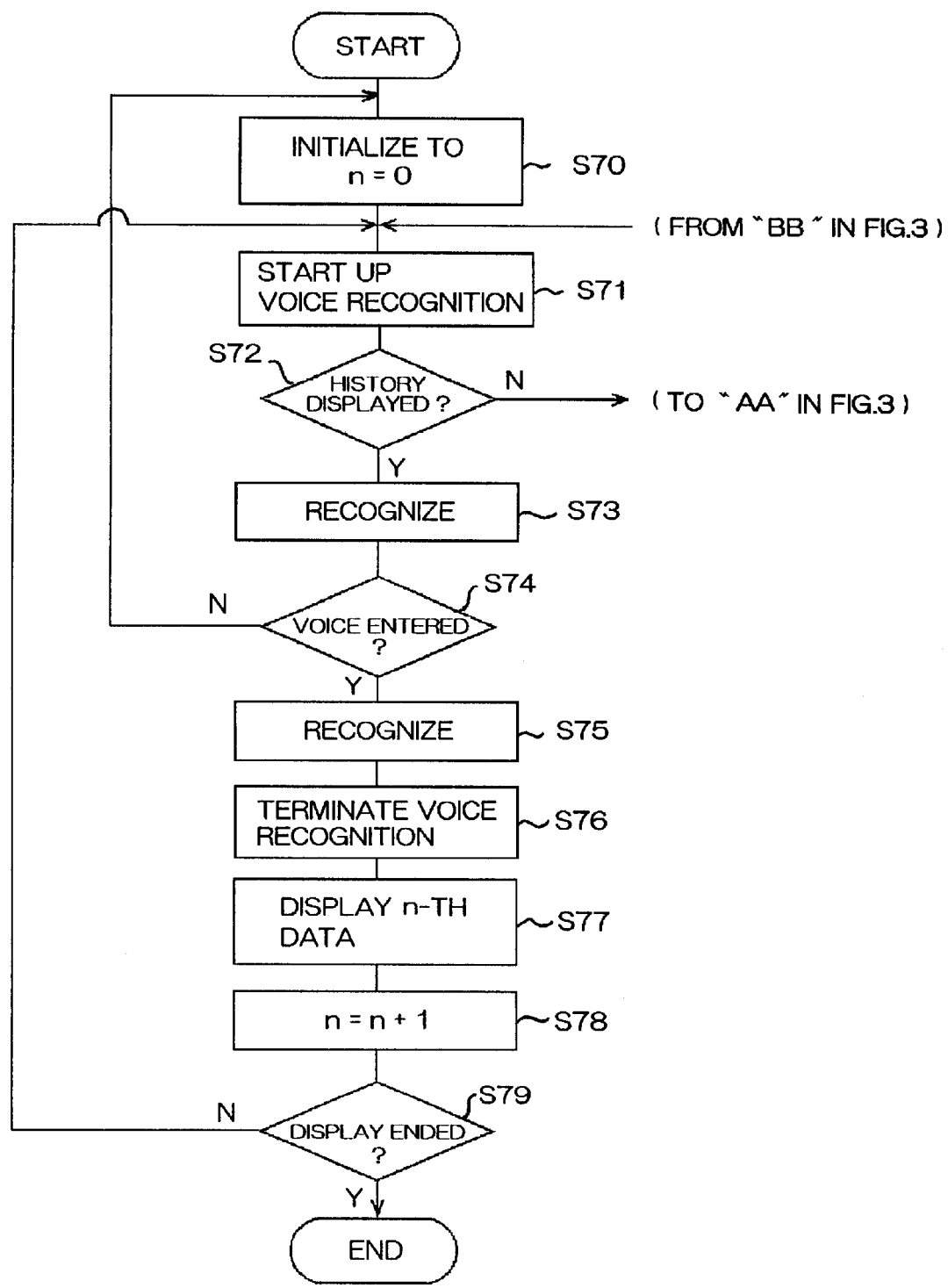
FIG. 5 is a flow chart of operations to be carried out in the mobile telephone in accordance with the third embodiment of the present invention.

The third embodiment of the present invention is explained hereinbelow with reference to FIG. 5, which is a flow chart of an operation to be carried out in the third embodiment.

First, an initial value n is set to be equal to zero (n=0) in step S70. This initial value constitutes a memory location number of reception or transmission history data of which the date and time are nearest to a current date and time. A memory such as RAM 19 can store a maximum number n of reception and transmission history data. Namely, the reception or transmission history data is numbered as n=0, 1, 2, . . . , n−2, n−1 and n in a direction from the oldest to newest ones.

The key switches are operated to thereby start up the voice recognition procedure for accepting a voice input, in step S71. In step S72, it is checked as to whether any history is currently displayed on LCD screen 22. If no history is displayed (NO in step S72), there is conducted the same procedure as the procedure starting from the marking AA to the marking BB in FIG. 3. The procedure will not be discussed any longer. It is now assumed that the voice recognition is ended, and a result of the recognition is transmitted to the control circuit 13 to thereby terminate the voice recognition procedure.

If it is ascertained in step S72 that any history data is displayed on LCD 22, it is checked in step S73 as to which history is being displayed on LCD 22, reception or transmission history. Depending upon the history being displayed on LCD 22, the corresponding history flag is turned ON.

The control circuit 13 waits for a voice to be entered. If no voice is made entry (NO in step S74), the voice recognition procedure is terminated, and the control circuit 13 is put in a waiting condition again until the voice recognition is restarted. If a voice is entered (YES in step S74), the control circuit 13 proceeds to a voice recognition procedure in step S75.

At this time, if it is judged that a prompting voice to display a next reception history data, such as "Reception history" or "Next display", for example, has been entered while reception history, for example, is being displayed, the judgement result is transmitted to the control circuit 13, which terminates the voice recognition procedure. Receiving the judgement result, the control circuit 13 displays an n-th data on LCD 22, in step S77.

At this time, if the voice-response mode is set, the recognition result is output through the receiver 16 as well. Then, the initial value n is changed into n=n+1 in step S78, and the control circuit 13 terminates the voice recognition procedure in step S79. Then, the control circuit 13 waits for a next operation, that is, an operation for restarting the voice recognition procedure.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 10-75412 filed on Mar. 24, 1998 including specification, claims, drawings and summary is incorporated herein by reference in its entirety.

What is claimed is:

1. A mobile telephone comprising:

(a) a speech recognizer for recognizing words made entry thereinto;

(b) a real-time identifier for identifying the current time;

(c) a memory storing reception/transmission history therein in association with the time at which reception/transmission was made; and (d) a controller, on entry of words identifying a certain time, into said speech recognizer, for evoking the reception/transmission history from said memory, based on the identified time.

2. The mobile telephone as set forth in claim 1, wherein, if a plurality of reception/transmission history are stored in said memory, said controller evokes the reception/transmission history one after another on entry of words into said speech recognizer.

3. A method of retrieving reception/transmission history in a mobile telephone, comprising the steps of:

(a) identifying the time at which reception/transmission was made, and storing reception/transmission history in association with the thus identified current time;

(b) recognizing speech of an operator; and (c) on entry of words identifying a certain time, into said mobile telephone, evoking the reception/transmission history, based on the identified time.

4. The method as set forth in claim 3, wherein, if there are stored a plurality of reception/transmission history, the reception/transmission history is evoked one after another in said step (c).

\* \* \* \* \*